US012583249B2

(12) United States Patent
Callamand et al.

(10) Patent No.: US 12,583,249 B2
(45) Date of Patent: Mar. 24, 2026

(54) ROLLER FOR HOT STAMPING

(71) Applicant: Illinois Tool Works Inc., Glenview, IL (US)

(72) Inventors: Laurent Callamand, Thoirette-Coisia (FR); Rodolphe De Simone, Béard-Géovreissiat (FR); Arnaud Villeneuve, Plateau d'Hauteville (FR); Nicolas Pradines, Samognat (FR)

(73) Assignee: Illinois Tool Works Inc.

( * ) Notice: Subject to any disclaimer, the term of this patent is extended or adjusted under 35 U.S.C. 154(b) by 0 days.

(21) Appl. No.: 18/627,003

(22) Filed: Apr. 4, 2024

(65) Prior Publication Data

US 2024/0336084 A1 Oct. 10, 2024

(30) Foreign Application Priority Data

Apr. 6, 2023 (FR) ...................................... 2303445
Mar. 15, 2024 (EP) .................................... 24315096

(51) Int. Cl.
*B44B 5/00* (2006.01)

(52) U.S. Cl.
CPC .......... *B44B 5/0076* (2013.01); *B44B 5/0009* (2013.01)

(58) Field of Classification Search
CPC ............................ B44B 5/0009; B44B 5/0076
See application file for complete search history.

(56) References Cited

U.S. PATENT DOCUMENTS 2,351,281 A 6/1944 Nachemov
2006/0219108 A1* 10/2006 Dorrell ................ B41F 19/068 101/178
2008/0216678 A1 9/2008 Stockli
2011/0179960 A1 7/2011 Sandow, II et al.
2014/0000465 A1* 1/2014 Chen ........................ B41F 9/02 101/32
2016/0193825 A1* 7/2016 Corcoran ............. B44B 5/0009 101/216

FOREIGN PATENT DOCUMENTS

CN 106241496 B * 5/2019 ............ B65H 18/26
CN 209781592 U * 12/2019
IT 201800009548 A1 4/2020
WO WO-2012007097 A2 * 1/2012 .......... B26D 7/2614

OTHER PUBLICATIONS

Search Report mailed Jan. 12, 2023 for corresponding Patent Application No. FR2303445 (9 pages).

* cited by examiner

*Primary Examiner* — Christopher E Mahoney
*Assistant Examiner* — Marissa Ferguson-Samreth
(74) *Attorney, Agent, or Firm* — Mary D. Lawlor; Carroll, Hoette & Butscher, LLC

(57) ABSTRACT

A hot stamping roller, the roller being designed to cooperate with an object to be decorated, the roller comprising at least a first roller part and a second roller part, each roller part being configured to rotate around a longitudinal axis of the roller, the rotation of the first roller part being independent of the rotation of the second roller part.

18 Claims, 9 Drawing Sheets

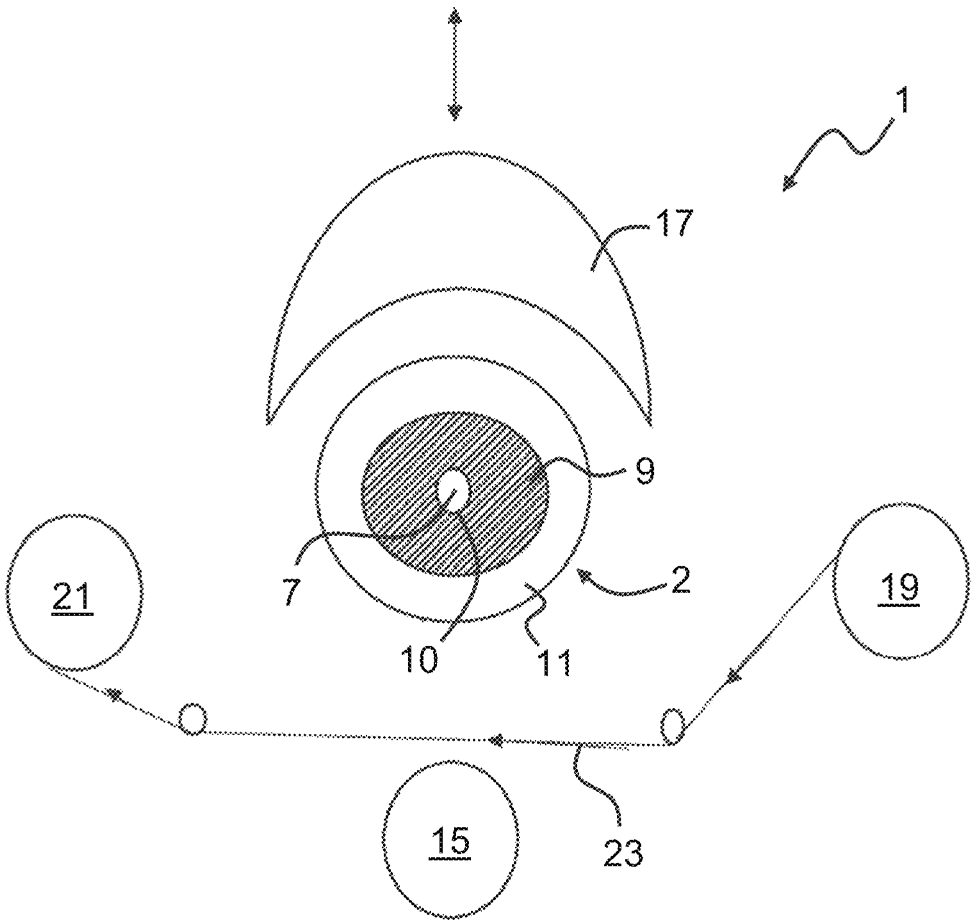
[Fig. 1]

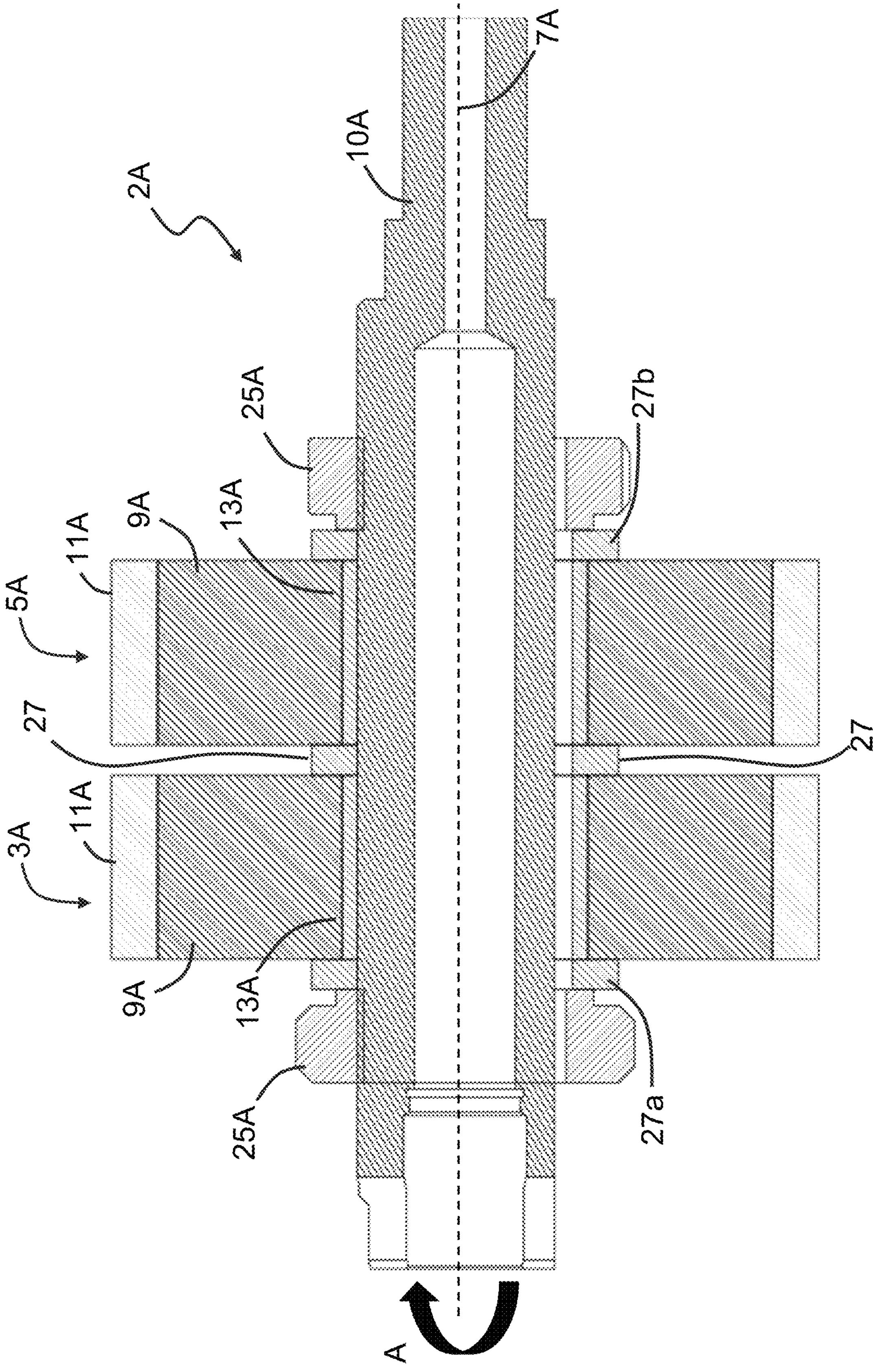
[Fig. 2]

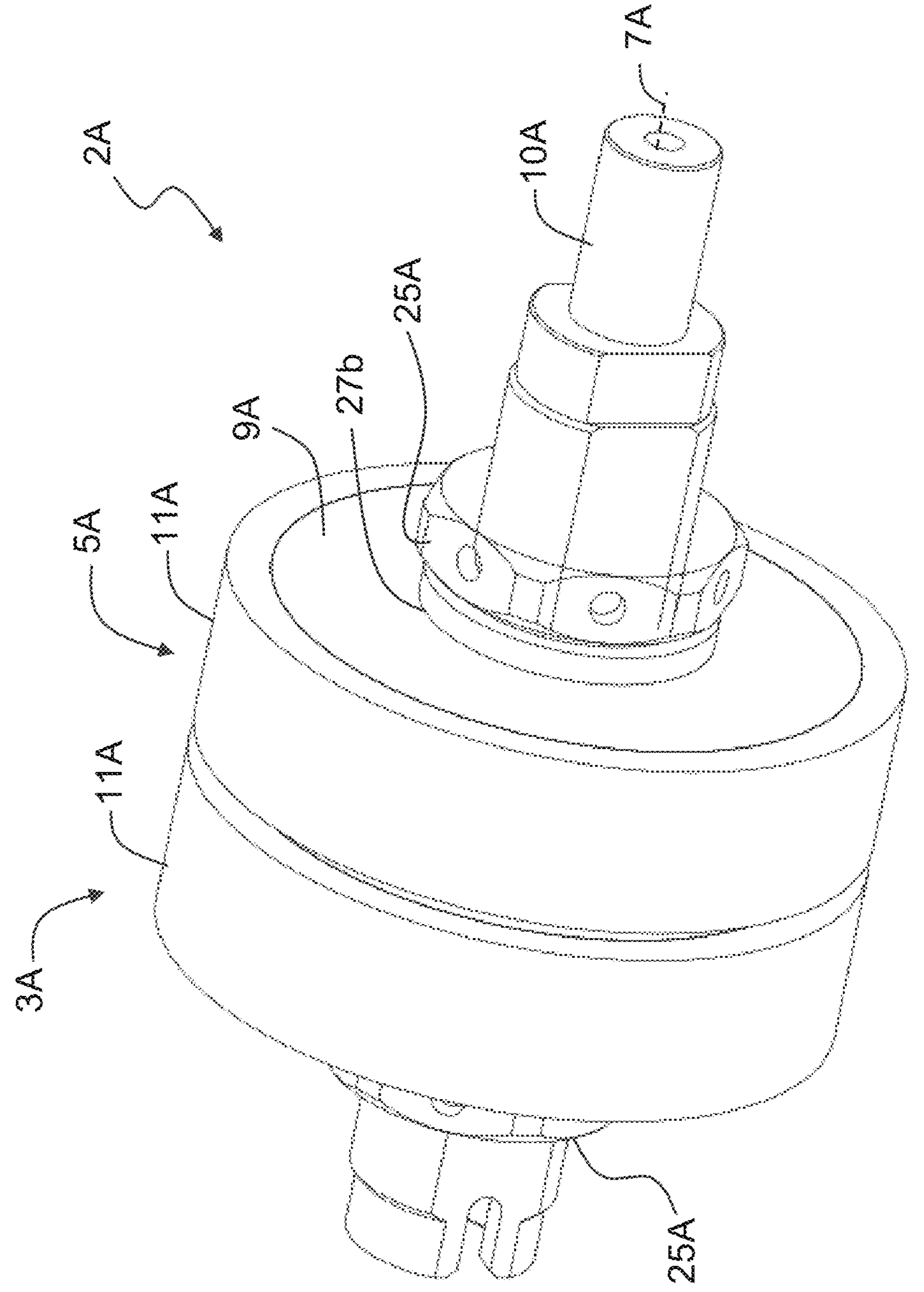
[Fig. 3]

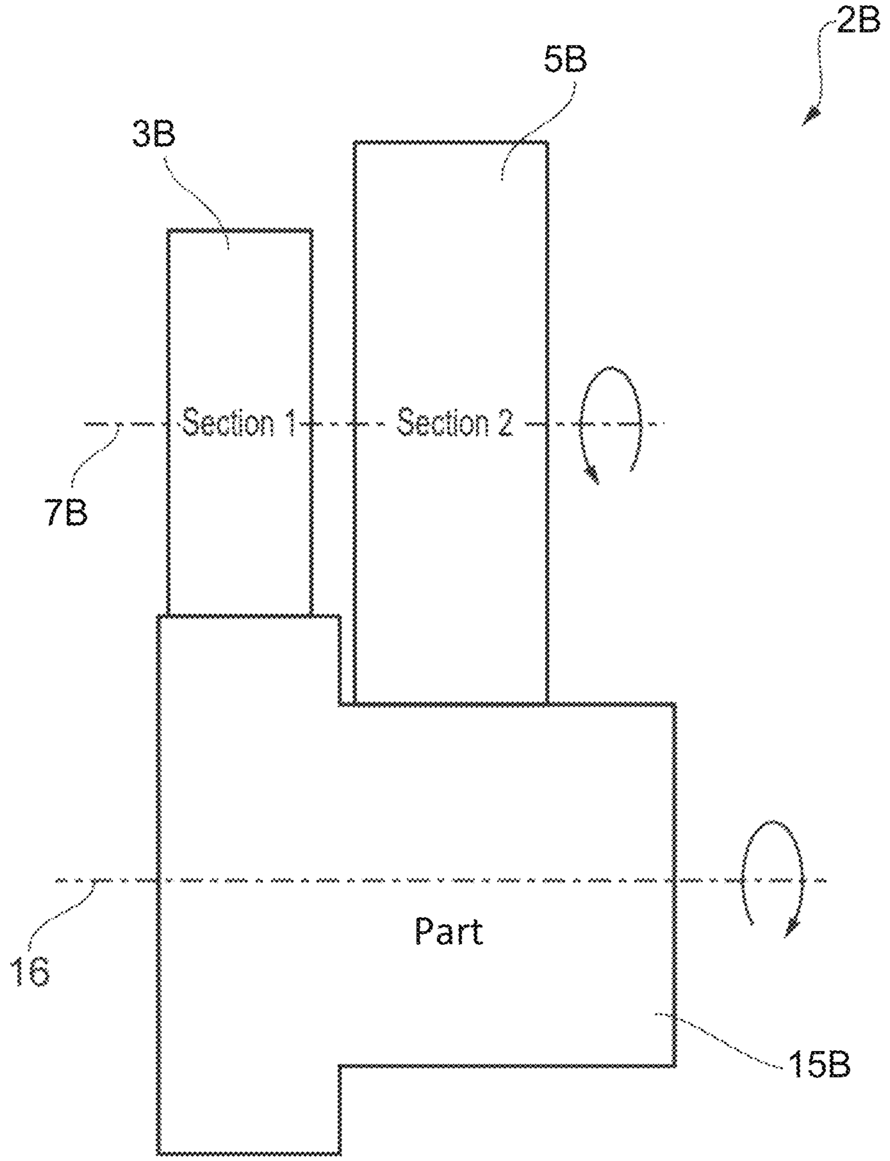
[Fig. 4]

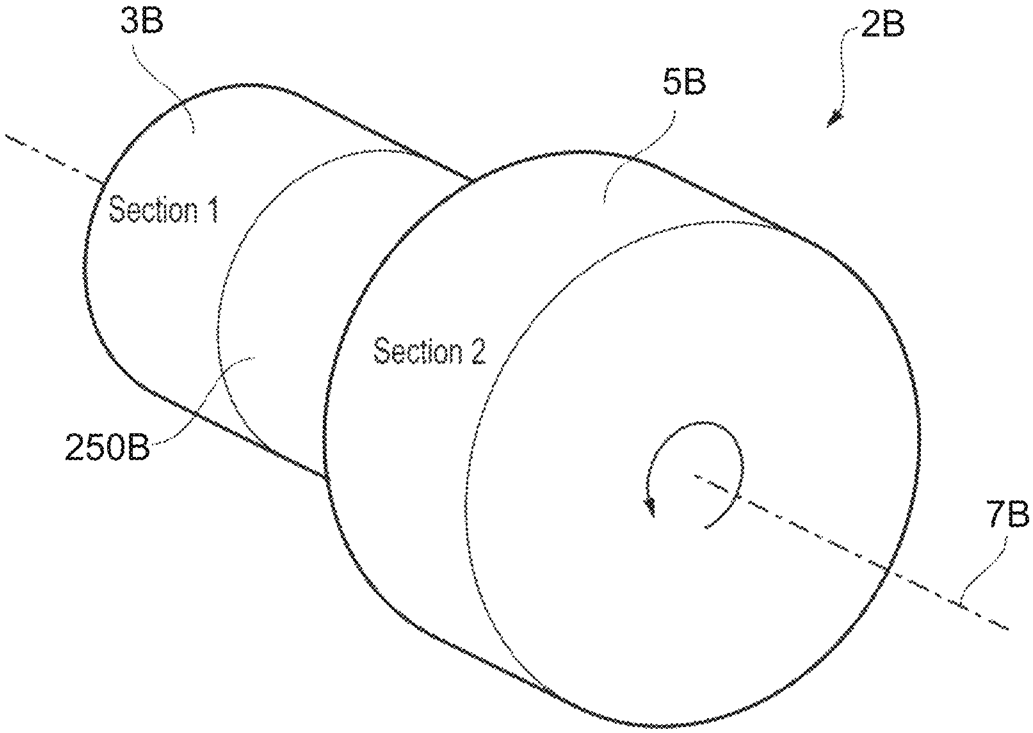
[Fig. 5]

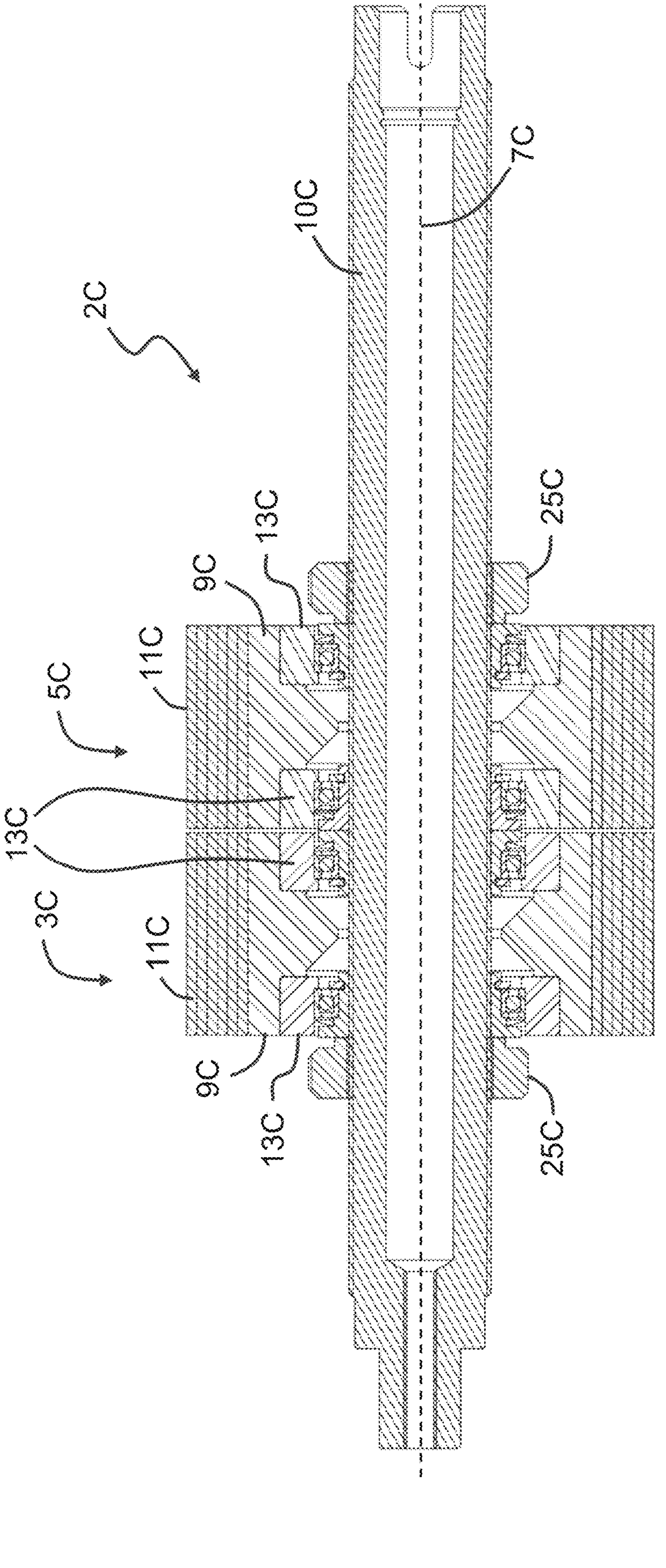
[Fig. 6]

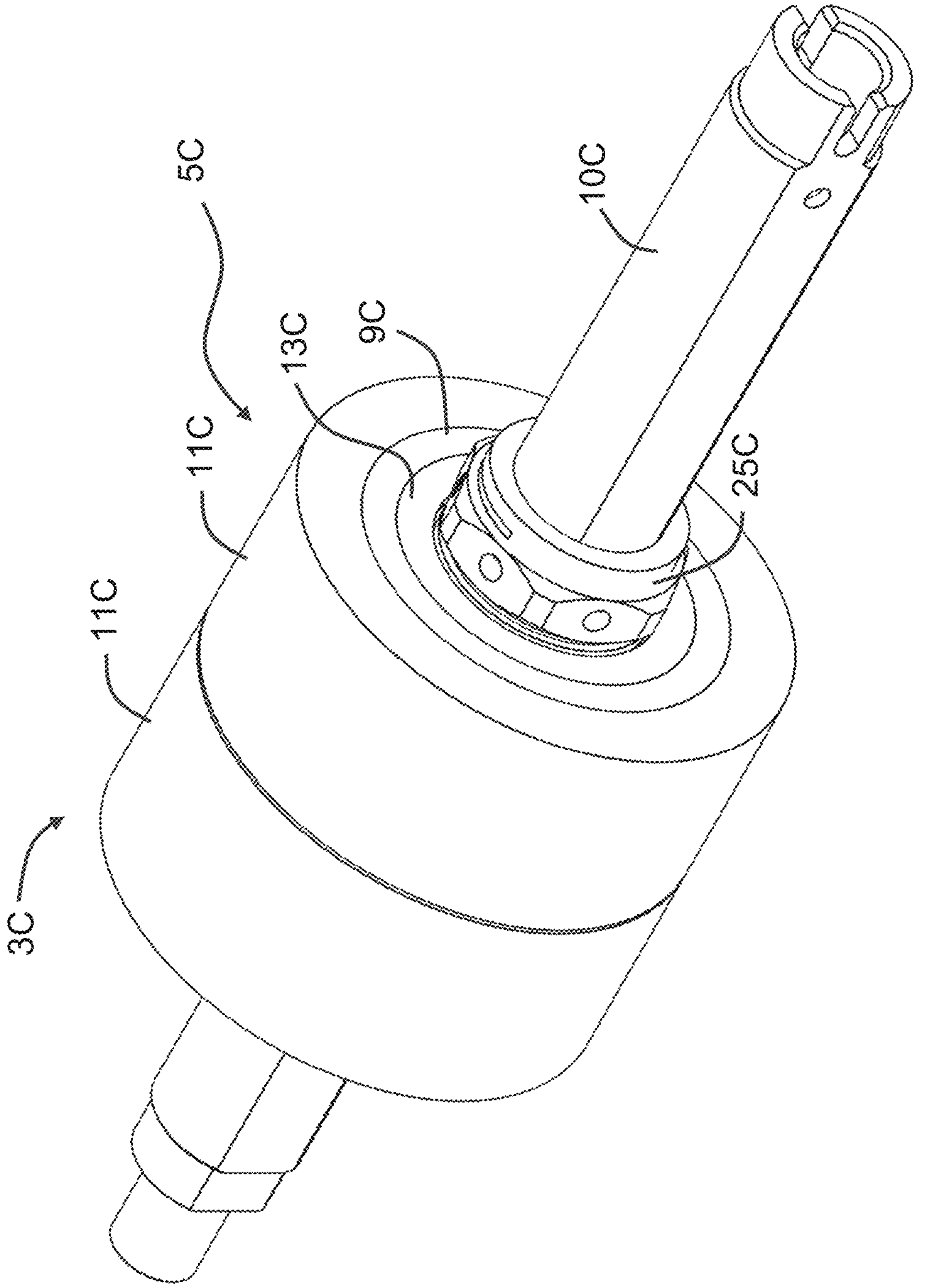
[Fig. 7]

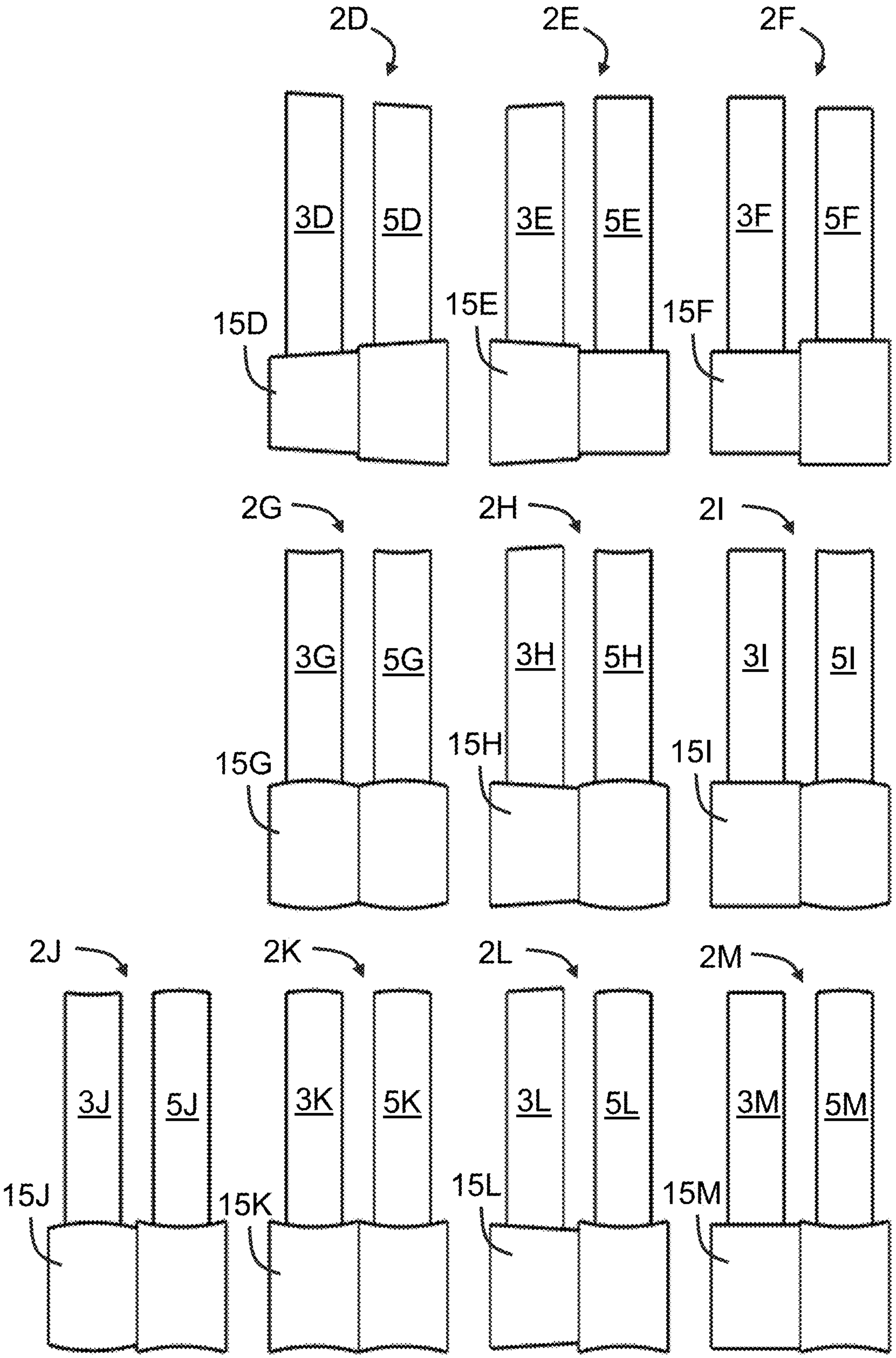
[Fig. 8]

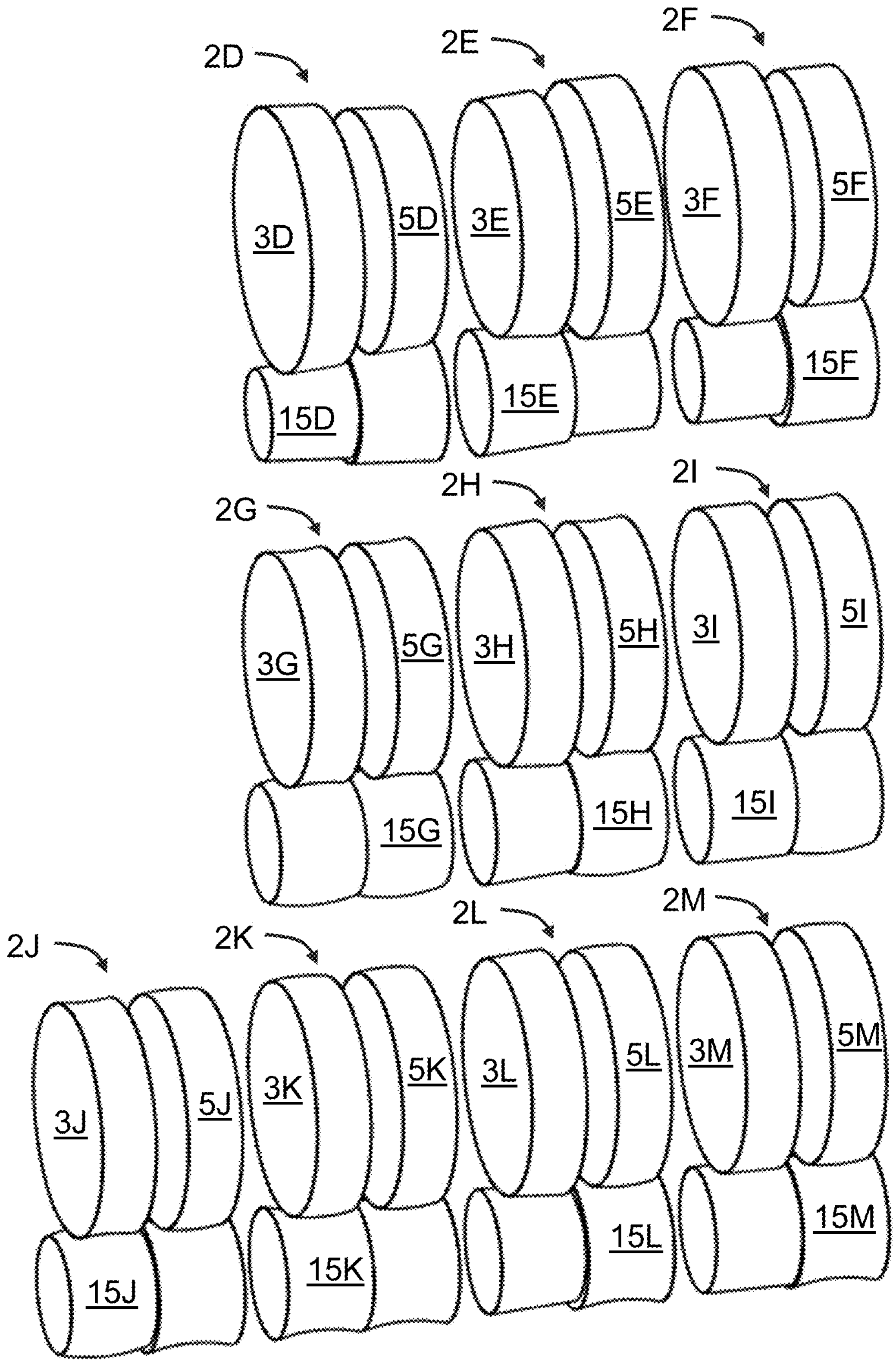
[Fig. 9]

ROLLER FOR HOT STAMPING

CROSS-REFERENCE TO RELATED APPLICATIONS

This application claims priority to French Patent Application No. 2303445 (filed 6 Apr. 2023) and European Patent Application No. 24315096.8 (filed 15-March-2024), the entire disclosures of which are incorporated herein by reference.

TECHNICAL FIELD OF THE INVENTION

The invention relates to a hot stamping roller. In particular, the invention relates to a hot stamping roller for decorating an object with a variable diameter along its length.

TECHNICAL BACKGROUND

Hot stamping using silicone or metal rollers is a well-known technique for decorating an object, for example by embossing and/or transferring a print or inks onto a surface. Typical hot stamping applications include packaging, for example in the cosmetics industry, or stamping glass items such as bottles and the like.

Hot stamping rollers can consist of a carrier core and a silicone surface wrapped around and attached to the carrier core. The carrier core can be made of metal, for example. The hot stamping roller is generally rotated around an axis of rotation extending in the longitudinal direction of the roller and in the center of the carrier core.

During the hot stamping process, the silicone surface of the roller is initially heated by a heat source, such as an infrared tile, or any other heat source, before being moved towards the object to be decorated. Typically, a film of transfer material extends between the silicone roller and the object. For example, the film is brought into contact with the object to be decorated by "applicator" guides. Then, the heat and pressure applied by the silicone roller to the film and the object underneath it transfer part of the film to the object.

When the object to be decorated is conical or, if the object has different diameters along its length, for example in a method for decorating a conical glass object, since the object's axis of rotation has the same rotational speed along its length, the tangential velocity at the object's surface is not the same if the object is not cylindrical.

When the object to be decorated is conical or, if the object has different diameters along its length, for example, with a small base of radius r1 and a large base of radius r2, the tangential velocity Vr2 is greater than Vr1.

As a result, when the cylindrical hot stamping roller is driven around its axis of rotation, as it is brought into contact with the object, slippage is created between the object and the roller, creating creases in the film. The hot stamping method can tolerate a slight difference in tangential velocity (on the order of a few percent). Beyond that, creasing in the film can cause problems with the transfer method.

The present invention aims to mitigate the drawbacks described above.

SUMMARY OF THE INVENTION

The invention provides a hot stamping roller, the roller being designed to cooperate with an object to be decorated, the roller comprising at least a first roller part and a second roller part, each roller part being configured to rotate around a longitudinal axis of the roller, the rotation of the first roller part being independent of the rotation of the second roller part.

In some embodiments, the object to be decorated is designed to be rotationally driven. In other embodiments, a specific stamping mode uses a longitudinal axis that describes a horizontal movement (for example, a rolling movement) relative to the object to be decorated. For example, it can roll over a flat or rounded side of the object to be decorated. The hot stamping roller, according to the present invention can therefore also be used to decorate two separate sections of the object to be decorated.

In some embodiments, at least one of the first and second roller parts is cylindrical, conical, concave or convex. In some embodiments, the first and second roller parts have different shapes. In some embodiments, the first and second roller parts have identical or similar shapes. In some embodiments, each of the first and second roller parts is cylindrical, conical, concave or convex.

In some embodiments, the first and second roller parts are cylindrical and have different diameters. A section of the first roller part is thus different from a section of the second roller part. Preferably, the diameter of each roller part is chosen to ensure that the tangential velocities of the roller surfaces at the points of contact with the surface of the object to be decorated are substantially the same over the entire length of the relevant section of the object to be decorated.

In some embodiments, the roller parts each comprise a carrier core.

Advantageously, the carrier core comprises a cylindrical body with a central bore.

The carrier core of each roller part comprises a longitudinal axis around which the roller part rotates when in motion. The longitudinal axis of each carrier core corresponds to the roller's longitudinal axis. More specifically, the roller's longitudinal axis is the central longitudinal axis of each carrier core.

In some embodiments, each roller part comprises a carrier core and a surface part.

In some embodiments, the surface part is made in one piece with the carrier core.

In some embodiments, the surface part is bonded, joined or otherwise attached to the carrier core.

In some embodiments, the roller comprises an axle. Advantageously, in these embodiments, the first and second roller parts are mounted on the axle. More specifically, the first and second roller parts receive the axle through their respective central bores. In such embodiments, the roller and the axle have the same longitudinal axis.

In some embodiments, the first roller part and/or the second roller part comprises a plain bearing. The plain bearing enables rotational movement between the roller part(s) and the roller's longitudinal axis. In some embodiments, the roller comprises an axle and the first roller part and/or the second roller part comprises a plain bearing, the bearing enabling rotational movement between the roller part(s) and the axle.

In some embodiments, at least the second roller part comprises at least one plain bearing, for example enabling the second roller part to rotate freely around the roller's longitudinal axis.

In some embodiments, the first roller part and/or the second roller part comprises a ball bearing or a roller bearing. In some embodiments, the first roller part and/or the second roller part comprises any other system for ensuring that each roller part has an independent speed.

The ball bearing or roller bearing enables rotational movement between the roller part(s) and the roller's longitudinal axis. In some embodiments, the roller comprises an axle and the first roller part and/or the second roller part comprises a ball bearing or a roller bearing, the ball bearing or roller bearing enabling rotational movement between the roller part(s) and the axle.

In some embodiments, at least the second roller part comprises at least one ball bearing or one roller bearing, for example enabling the second roller part to rotate freely around the roller's longitudinal axis.

In some embodiments, each of the first and second roller parts comprises at least one ball bearing or one roller bearing, for example to enable it to rotate independently of the other roller part.

In some embodiments, the first roller part and/or the second roller part fit onto the roller axle, enabling relative movement between the first roller part and/or the second roller part and the axle, independently of one another. In such embodiments, the first roller part, the second roller part, the plain bearing and the axle are preferably coaxial with each other.

In some embodiments, the first roller part can be fixed relative to the axle. More specifically, the first roller part and the axle rotate together.

In some embodiments, the roller comprises a first roller part that rotates with the roller's longitudinal axis and a second roller part that rotates freely relative to the roller's longitudinal axis by means of a plain bearing. Advantageously, the plain bearing is located between the carrier core of the second roller part and the axle. As a result, the second roller part is free to rotate around the axle.

In some embodiments, the rotational speed of the first roller part is equal to the rotational speed of the longitudinal axis. In these embodiments, the rotational speed of the second roller part is independent of the rotational speed of the first roller part and of the longitudinal axis. As a result, the rotational speed of the second roller part can be substantially equal to the rotational speed of the adjacent part of the object to be decorated.

In some embodiments, when the longitudinal axis is not in contact with the object to be decorated, due to friction between the roller parts among themselves and/or with the longitudinal axis, the part(s) that are free to rotate can synchronize with the speed of the longitudinal axis. This advantageously makes it possible to drive (by friction) the free part(s) during a heating phase, for example.

In some embodiments, the roller is a multi-part roller comprising more than two roller parts.

In some embodiments, a first roller part rotates with the roller's longitudinal axis and two or more roller parts are configured to rotate freely relative to the roller's longitudinal axis. In these embodiments, the two or more roller parts rotate independently of the first roller part. In such embodiments, the two or more roller parts can rotate independently of each other.

In some embodiments, each roller part is configured to rotate freely relative to the roller's longitudinal axis. More specifically, each roller part can be configured to rotate independently of any other roller part.

In some embodiments, each roller part comprises a carrier core and a surface part.

In some embodiments, each roller part, in contact with the object to be decorated, can be adjusted to the tangential velocity of the object to be decorated at the point of contact between the object to be decorated and the or each section of roller part.

In some embodiments, at least one of the first and second roller parts is cylindrical. In some embodiments, each of the first and second roller parts is cylindrical. In other embodiments, at least one of the first and second roller parts is conical. In some embodiments, each of the first and second roller parts is conical.

In some embodiments, the first and second roller parts are cylindrical, and the first roller part has a different diameter from the second roller part.

In some embodiments, each roller part has a different diameter. This arrangement is particularly suited to a conical object to be decorated, for example.

In some embodiments, the roller parts abut one another along the roller axle.

In some embodiments, the roller parts are spaced apart longitudinally along the roller's longitudinal axis. More specifically, the roller can comprise spacers between the roller parts.

In some embodiments, each roller part comprises a silicone surface part.

In some embodiments, each roller part comprises a carrier core and a silicone layer covering the carrier core.

In some embodiments, the carrier core is made of metal.

In some embodiments, at least the second roller part is free to adapt its rotational speed to the tangential velocity of the object to be decorated at the point of contact between them.

In some embodiments, the roller is rotationally driven.

In some embodiments, the roller is rotationally driven by a drive shaft that extends along the longitudinal axis of the roller. In some embodiments, the drive shaft can be driven by a motor.

In some embodiments, the roller axle forms the drive shaft and is rotationally driven.

In some embodiments, the object to be decorated is rotationally driven. More specifically, the object to be decorated is rotationally driven by a drive mechanism such as a motor. In these embodiments, the roller can be rotationally driven by friction between the object to be decorated, which is rotated by a drive mechanism such as a motor, and the roller.

The invention also provides a hot stamping machine comprising a roller according to the present invention.

The invention also provides a hot stamping machine comprising a hot stamping roller, the roller being designed to cooperate with an object to be decorated, the roller comprising at least a first roller part and a second roller part, each roller part being configured to rotate around a longitudinal axis of the roller, the rotation of the first roller part being independent of the rotation of the second roller part.

In some embodiments, the hot stamping machine further comprises a mechanism for driving the rotation of at least the first roller part or the second roller part.

In some embodiments, the hot stamping machine further comprises a mechanism for rotationally driving the object to be decorated.

In some embodiments, the hot stamping machine comprises a first film feed system and a second film feed system. In some embodiments, each film feed system comprises at least one feed roller and one rewind roller. As a result, each film feed system can be used to wind the film between the feed roller and the rewind roller. The roller and the object to be decorated are positioned between the feed roller and the rewind roller so that the film passes between the roller and the object to be decorated when the film feed system is in operation.

As a result, the film running over each roller part is separate from another film running over another roller part. Multiple film feed systems, each feeding a single roller part, keep the films from creasing.

In some embodiments, the hot stamping machine comprises a heat source that can be used to increase the temperature of the roller surface. It is preferable for the surface of each roller part to be rotated continuously to avoid overheating any part of the roller surface.

In some embodiments, the heat source can be an infrared heat source.

In some embodiments, the hot stamping machine comprises a heat sensor that can be used to monitor the surface temperature of the roller part(s).

The hot stamping machine and the roller according to the invention can be used to decorate glass, for example. Other applications include, but are not limited to, decorative objects made of plastic and metal.

For the avoidance of doubt, all the features described herein also apply to any aspect of the invention.

As part of this application, it is expressly provided that the various aspects, embodiments, examples and alternatives disclosed in the preceding paragraphs, in the claims and/or in the following description and drawings, and in particular the individual features thereof, may be taken separately or in any combination. In other words, all embodiments and/or features of any embodiment may be combined in any way, unless these features are incompatible.

For the avoidance of doubt, the terms "can", "and/or", "for example", "for example" [sic: repeated expression] and any other similar term used herein must be interpreted as not limiting, such that any feature described herein is not necessarily required to be present. Indeed, any combination of optional features is expressly foreseen without departing from the scope of the invention, whether or not they are expressly claimed. The applicant reserves the right to amend any claim originally filed or to file any new claim accordingly, including the right to amend any claim originally filed to depend on and/or incorporate any feature of any other claim, though it is not originally claimed in this manner.

BRIEF DESCRIPTION OF THE FIGURES

Other features and advantages of the invention will become apparent from the following detailed description, which will be understood in reference to the appended drawings, in which:

FIG. 1 shows a schematic view of part of a hot stamping machine according to one example of the invention;

FIG. 2 shows a cross-sectional view of a roller with two freely rotating roller parts;

FIG. 3 shows a perspective view of the roller shown in FIG. 2;

FIG. 4 shows a hot stamping roller and a shouldered cylindrical object to be decorated; and FIG. 5 shows the first and second roller parts in another embodiment;

FIG. 6 shows a cross-sectional view of another roller with two freely rotating roller parts;

FIG. 7 shows a perspective view of the roller shown in FIG. 6;

FIG. 8 shows several different hot stamping rollers, each with a shouldered cylindrical object to be decorated; and FIG. 9 shows a perspective view of the rollers and objects shown in FIG. 8.

DETAILED DESCRIPTION OF THE FIGURES

Different aspects of different embodiments of the invention are described in more detail below, in reference to FIGS. 1 to 5.

In all drawings, similar features are represented by the same reference number. In other embodiments, the reference numbers of similar features are increased by a factor of 10. Unless otherwise specified, the features of one embodiment can be used in any other embodiment.

FIG. 1 shows a schematic view of part of a hot stamping machine 1. The machine comprises an object to be decorated 15 and a hot stamping roller 2. The hot stamping roller 2 comprises a metal carrier core 9 and a silicone surface 11 attached to the metal carrier core 9. The metal carrier core 9 has a central bore and is mounted via the central bore on a roller axle 10. The longitudinal axis 7 of the hot stamping roller 2 extends into the page perpendicular to the plane of the page. A heating mechanism 17 extends over part of the silicone surface 11 to increase the temperature of the surface 11. A film feed system comprises a feed roller 19 and a rewind roller 21, configured to distribute the film 23 between them and between the hot stamping roller 2 and the object 15.

When in operation, the object 15 and/or the roller axle 10 are rotationally driven. The roller 2 rotates around the longitudinal axis 7 so that the heated silicone surface 11 is brought into contact with the film 23 and so that part of the film is transferred to the object under the effect of the pressure and of the temperature applied to the film between the roller 2 and the object 15.

FIG. 2 shows a cross-sectional view of a hot stamping roller 2A with two rotating roller parts 3A, 5A. Each roller part 3A, 5A has a silicone surface part 11A supported by and attached to a carrier core 9A of the roller.

The roller 2A comprises an axle 10A. The first and second roller parts 3A, 5A are mounted on the axle 10A by inserting the axle 10A through the central bore of each roller part 3A, 5A. The first and second roller parts 3A, 5A are held in place on the axle 10A by nuts 25 and spaced apart by spacers 27. Other end spacers 27*a* and 27*b* are located between the nuts 25 and the adjacent roller part 3A, 5A, respectively.

The first roller part 3A and the second roller part 5A comprise a central bore for receiving the axle 10A. In such embodiments, the roller's longitudinal axis and the axle's longitudinal axis are the same axis 7A.

Plain bearings 13A located between the carrier core of each roller part 3A, 5A and the axle 10A ensure that each roller part is free to rotate around the roller's longitudinal axis 7A. The rotation of each roller part 3A, 5A around the axis 7A is independent of the rotation of the other roller part 3A, 5A.

The axis of the axle 10A is rotationally driven around the axis 7A in the direction of the arrow A by a motor (not shown).

FIG. 3 shows a perspective view of the roller 2A shown in FIG. 2. The first roller part 3A and the second roller part 5A are spaced apart along the longitudinal axis 7A and the axle 10A of the roller 2A.

In the alternative embodiment shown in the illustrative FIG. 4, the cylindrical object 15B has different diameters along its length. In one such embodiment, the first roller part 3B and the second roller part 5B comprise different diameters. The first roller part 3B has a smaller diameter than the second roller part 5B to match the T-shaped cylindrical object 15B comprising a first section of greater diameter and a second section of smaller diameter. The object 15B has a shoulder section of greater diameter than the body section extending longitudinally from the shoulder of the object 15B. The first roller part 3B is configured to rotate with the axis 7B, while the second roller part 5B is configured to rotate freely around the axis 7B. As a result, the rotating speeds of the first and second roller parts 3B, 5B can be varied to suit the speed of the portion of the object 15B in contact with the respective roller part 3B, 5B.

FIG. 5 shows the first and second roller parts of the silicone hot stamping roller 2B shown in FIG. 4. The roller parts 3B, 5B have different diameters and a third conical roller part 250B is positioned between the first and second roller parts 3B, 5B. The third roller part 250B provides a conical surface between the first roller part 3B and the second roller part 5B. The third roller part 250B is free to rotate around the axis 7B independently of the first roller part 3B and second roller part 5B.

FIG. 6 shows a cross-sectional view of another embodiment of a hot stamping roller 2C with two rotating roller parts 3C, 5C. Each roller part 3C, 5C has a silicone surface part 11C supported by and attached to a carrier core 9C of the roller.

The roller 2C comprises an axle 10C. The first and second roller parts 3C, 5C are mounted on the axle 10C by inserting the axle 10C through the central bore of each roller part 3C, 5C. Each of the first and second roller parts 3C, 5C is rotatably mounted on the axle 10C and spaced apart by roller bearings 13C. The first and second roller parts 3C, 5C are also held in place on the axle 10C by nuts 25C.

The first roller part 3B and the second roller part 5B comprise a central bore for receiving the axle 10B. In such embodiments, the roller's longitudinal axis and the axle's longitudinal axis are the same axis 7B.

The roller bearings 13C located between the carrier core 9C of each roller part 3C, 5C and the axle 10C ensure that each roller part is free to rotate around the roller's longitudinal axis 7C. The rotation of each roller part 3C, 5C around the axis 7C is independent of the rotation of the other roller part 3C, 5C.

FIG. 7 shows a perspective view of the roller 2C shown in FIG. 6. The first roller part 3C and the second roller part 5C are spaced apart along the longitudinal axis 7C and the axle 10C of roller 2C.

FIG. 8 shows several different hot stamping rollers 2D, 2E, 2F, 2G, 2H, 2I, 2J, 2K, 2L, 2M, each with a shouldered cylindrical object to be decorated 15D, 15E, 15F, 15G, 15H, 15I, 15J, 15K, 15L, 15M.

A first roller 2D comprises a pair of conical roller parts 3D, 5D, each with a different diameter, for cooperating with correspondingly-shaped portions of a first object 15D. A second roller 2E comprises a conical roller part 3E and a cylindrical roller part 5E for cooperating with correspondingly-shaped portions of a second object 15E. A third roller 2F comprises two roller parts 3F, 5F, each with a different diameter, for cooperating with correspondingly-shaped portions of a third object 15F. A fourth roller 2G comprises a pair of concave roller parts 3G, 5G for cooperating with convex portions of a fourth object 15G. A fifth roller 2H comprises a conical part 3H and a concave part 5H for cooperating with correspondingly-shaped conical and convex portions of a fifth object 15H.

A sixth roller 2I comprises a cylindrical part 3I and a concave part 5I for cooperating with correspondingly-shaped cylindrical and convex portions of a sixth object 15I. A seventh roller 2J comprises a concave roller part 3J and a convex roller part 5J for cooperating with correspondingly-shaped convex and concave portions of a seventh object 15J.

An eighth roller 2K comprises a pair of convex roller parts 3K, 5K for cooperating with concave portions of an eighth object 15K. A ninth roller 2L comprises a conical part 3L and a convex part 5L for cooperating with correspondingly-shaped conical and concave portions of a ninth object 15L. A tenth roller 2M comprises a cylindrical part 3M and a convex part 5M for cooperating with correspondingly-shaped cylindrical and concave portions of a tenth object 15M.

FIG. 9 shows a perspective view of rollers 2D, 2E, 2F, 2G, 2H, 2I, 2J, 2K, 2L, 2M and objects 15D, 15E, 15F, 15G, 15H, 15I, 15J, 15K, 15L, 15M from FIG. 8.

In another alternative embodiment, a hot stamping roller can be used to decorate a conical object. In one such embodiment, a silicone roller for hot stamping conical objects comprises a first roller part and a second roller part with different diameters. The first roller part and the second roller part each have a common longitudinal axis. The first roller part rotates with the longitudinal axis and the second roller part rotates freely relative to the longitudinal axis by means of a plain bearing.

The person skilled in the art will be aware that several variants of the aforementioned embodiments are conceivable without departing from the scope of the invention.

Throughout the description and claims of this specification, the words "comprise" and "contain" and their variations mean "including but not limited to" and are not intended for (and do not exclude) other parts, additives, components, integers or steps.

Any features, integers, characteristics, compounds or groups described in connection with a particular aspect, embodiment or example of the invention are to be understood as being applicable to any other aspect, embodiment or example described herein, unless inconsistent therewith. All of the features disclosed in this specification (including the claims, abstract and accompanying drawings), and/or all of the steps of a method or of a process thus disclosed, may be combined in any combination other than combinations in which at least some of such features and/or steps are mutually exclusive. The invention is not limited to the details of all of the preceding embodiments. The invention extends to any new feature or any new combination of the features disclosed in this specification (including the claims, abstract and accompanying drawings), or to any new feature or any new combination of the steps of any method or process thus disclosed.

LIST OF REFERENCE SYMBOLS

1 Hot stamping machine
2 Roller
2A Roller
2B Roller
2C Roller
2D Roller
2E Roller
2F Roller
2G Roller
2H Roller
2I Roller
2J Roller
2K Roller
2L Roller
2M Roller
3A First roller part
3B First roller part
3C First roller part

3D First roller part
3E First roller part
3F First roller part
3G First roller part
3H First roller part
31 First roller part
3J First roller part
3K First roller part
3L First roller part
3M First roller part
5A Second roller part
5B Second roller part
5C Second roller part
5D Second roller part
5E Second roller part
5F Second roller part
5G Second roller part
5H Second roller part
5I Second roller part
5J Second roller part
5K Second roller part
5L Second roller part
5M Second roller part
7 Longitudinal axis of the roller
7A Longitudinal axis of the roller
7B Longitudinal axis of the roller
7C Longitudinal axis of the roller
9 Carrier pin for the roller part
9A Carrier pin for the roller part
9B Carrier pin for the roller part
10 Axle
10A Axle
10C Axle
11 Surface silicone part
11A Surface silicone part
11C Surface silicone part
13A Slide bearings
13C Roller bearings
15 Object to be decorated
15B Object to be decorated
15D Object to be decorated
15E Object to be decorated
15F Object to be decorated
15G Object to be decorated
15H Object to be decorated
15I Object to be decorated
15J Object to be decorated
15K Object to be decorated
15L Object to be decorated
15M Object to be decorated
16 Rotational axis of the object
17 Heating mechanism
19 Feed roller
21 Rewind roller
23 Film
25 Nut
27 Spacer
27*a* End spacers
27*b* End spacers

The invention claimed is:

1. A hot stamping roller designed to cooperate with an object to be decorated, the roller comprising:

roller parts including at least a first roller part and a second roller part, wherein the first and second roller parts have different diameters, each of the first and second roller parts configured to rotate around a longitudinal axis of the roller, rotation of the first roller part being independent of rotation of the second roller part, wherein the first and second roller parts are configured to rotate around the longitudinal axis of the roller while contacting a film between the roller parts and the object, the diameters of the first roller part and the second roller part being different so that velocities of surfaces of the first roller part and the second roller part at points of contact with the object are equivalent over a section of the object being decorated by the roller and the film.

2. The hot stamping roller according to claim 1, wherein at least one of the first roller part or the second roller part is cylindrical, conical, concave, or convex.

3. The hot stamping roller according to claim 1, wherein a first surface of the first roller part that contacts the film during decoration of the object is one of a cylindrical surface, a conical surface, a concave surface, or a convex surface, and a second surface of the second roller part that contacts the film during decoration of the object is a different one of the cylindrical surface, the conical surface, the concave surface, or the convex surface.

4. The hot stamping roller according to claim 1, wherein the roller comprises a carrier core.

5. The hot stamping roller according to claim 1, wherein each of the first and second roller parts comprises a carrier core and a surface part.

6. The hot stamping roller according to claim 5, wherein the surface part of at least the first roller part is made in one piece with the carrier core.

7. The hot stamping roller according to claim 1, further comprising an axle, wherein the first and second roller parts are mounted on the axle.

8. The hot stamping roller according to claim 7, wherein at least the second roller part comprises a plain bearing between the at least the second roller part and the axle enabling the second roller part to freely rotate around the longitudinal axis of the roller.

9. The hot stamping roller according to claim 7, wherein at least the second roller part comprises at least one roller bearing between the at least second roller part and the axle, the at least one roller bearing enabling the second roller part to freely rotate around the longitudinal axis of the roller.

10. The hot stamping roller according to claim 9, wherein each of the first and second roller parts comprises at least one roller bearing enabling the respective first or second roller part to independently rotate relative to another of the second or first roller part.

11. The hot stamping roller according to claim 1, wherein the first and second roller parts comprise a plain bearing enabling the first and second roller parts to freely rotate around the longitudinal axis of the roller independently of each other.

12. The hot stamping roller according to claim 8, wherein the first roller part rotates with the longitudinal axis of the roller and the second roller part freely rotates relative to the longitudinal axis of the roller.

13. The hot stamping roller according to claim 1, wherein each of the first and second roller parts is configured to rotate around the longitudinal axis of the roller while contacting the film between the roller parts and the object, the first and second roller parts contacting the film and transferring part of the film onto the object.

14. The hot stamping roller according to claim 13, wherein the first roller part and the second roller part have conical surfaces that contact the film and different diameters.

15. The hot stamping roller according to claim 13, wherein the first roller part and the second roller part have concave or convex surfaces that contact the film.

16. The hot stamping roller according to claim 13, wherein surfaces of the first roller part and the second roller part that contact the film are heated.

17. A hot stamping machine comprising a hot stamping roller, the roller designed to cooperate with an object to be decorated, the roller comprising at least a first roller part and a second roller part, wherein the first and second roller parts have different diameters, each of the first roller part and the second roller part configured to rotate around a longitudinal axis of the roller while contacting a film and transferring a part of the film onto the object, rotation of the first roller part being independent of rotation of the second roller part, wherein the diameters of the first roller part and the second roller part are different so that velocities of surfaces of the first roller part and the second roller part at points of contact with the film are equivalent over a section of the object being decorated by the roller and the film.

18. The hot stamping machine according to claim 17, comprising first and second film feed systems that move the film between the roller and the object.

* * * * *